United States Patent
Dautrey et al.

(10) Patent No.: US 9,597,930 B2
(45) Date of Patent: Mar. 21, 2017

(54) PNEUMATIC TIRE TREAD

(75) Inventors: Nicolas Dautrey, Ota (JP); Yasuhiko Futamura, Arao (JP); Ludovic Greverie, Ota (JP); Yuji Kanno, Ota (JP); Gael Roty, Ota (JP); Nanae Shimanaka, Kyoto (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 903 days.

(21) Appl. No.: 13/879,306

(22) PCT Filed: Oct. 15, 2010

(86) PCT No.: PCT/JP2010/068180
§ 371 (c)(1),
(2), (4) Date: Sep. 27, 2013

(87) PCT Pub. No.: WO2012/049772
PCT Pub. Date: Apr. 19, 2012

(65) Prior Publication Data
US 2014/0007997 A1    Jan. 9, 2014

(51) Int. Cl.
*B60C 11/13* (2006.01)
*B60C 19/00* (2006.01)
*B60C 11/04* (2006.01)

(52) U.S. Cl.
CPC ........ *B60C 11/1353* (2013.04); *B60C 11/047* (2013.04); *B60C 11/13* (2013.01); *B60C 19/002* (2013.04)

(58) Field of Classification Search
CPC ......... B60C 11/1353; B60C 2011/1361; B60C 11/047

(Continued)

(56) References Cited

U.S. PATENT DOCUMENTS

| | | | | |
|---|---|---|---|---|
| 2001/0054464 A1* | 12/2001 | Tozawa | ................. | B60C 11/042 152/209.18 |
| 2008/0078487 A1* | 4/2008 | Ohara | ................ | B29D 30/0606 152/209.19 |
| 2011/0259493 A1* | 10/2011 | Dautrey | .................. | B60C 11/13 152/209.18 |

FOREIGN PATENT DOCUMENTS

| | | |
|---|---|---|
| JP | 3-276802 A | 12/1991 |
| JP | 11-217007 A | 8/1999 |

(Continued)

OTHER PUBLICATIONS

International Search Report (PCT/ISA/210) issued on Nov. 9, 2010, by the Japanese Patent Office as the International Searching Authority for International Application No. PCT/JP2010/068180.

*Primary Examiner* — Timothy Kennedy
(74) *Attorney, Agent, or Firm* — Dickinson Wright PLLC

(57) ABSTRACT

A tread for a pneumatic tire in which air column resonance sound is reduced and wear of the groove fences and tread portion are caused to be approximately the same, while drainage performance is maintained, wherein a plurality of groove fences are formed and are installed within at least one circumferential groove, extending from the bottom of the circumferential groove, and block at least 70% of the cross-sectional area of the circumferential groove, and the bending parameter of the groove fences, defined as $E \cdot I/(h3l)$ (where E is the modulus at 10% elongation of the material used for the groove fences, I is the second moment of area of the groove fence, h is the height of the groove fence, and l is the width of the groove fence) is at least equal to 250 Pa and at most equal to 350 Pa.

7 Claims, 4 Drawing Sheets

(58) Field of Classification Search
USPC .................................................. 152/209.19
See application file for complete search history.

(56) References Cited

FOREIGN PATENT DOCUMENTS

| | | |
|---|---|---|
| JP | 2006-341655 A | 12/2006 |
| JP | 2007-290538 A | 11/2007 |
| JP | 2009-255867 A | 11/2009 |
| JP | 2010-052698 A | 3/2010 |

* cited by examiner

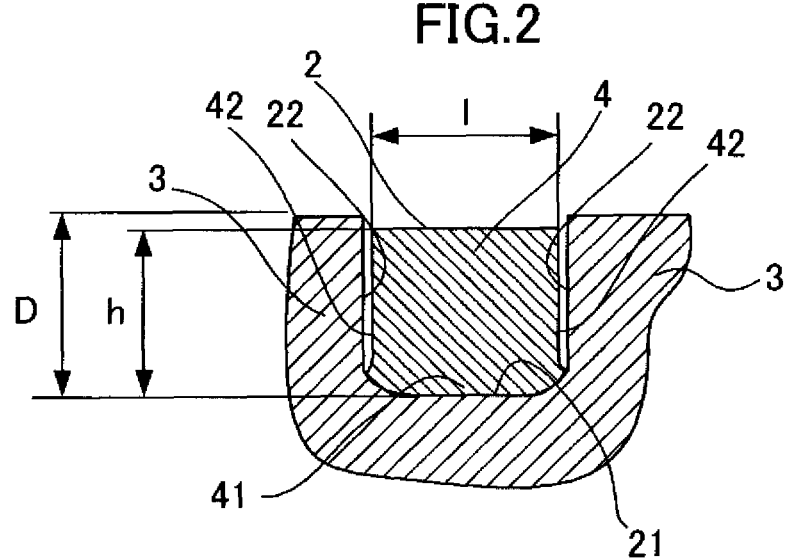
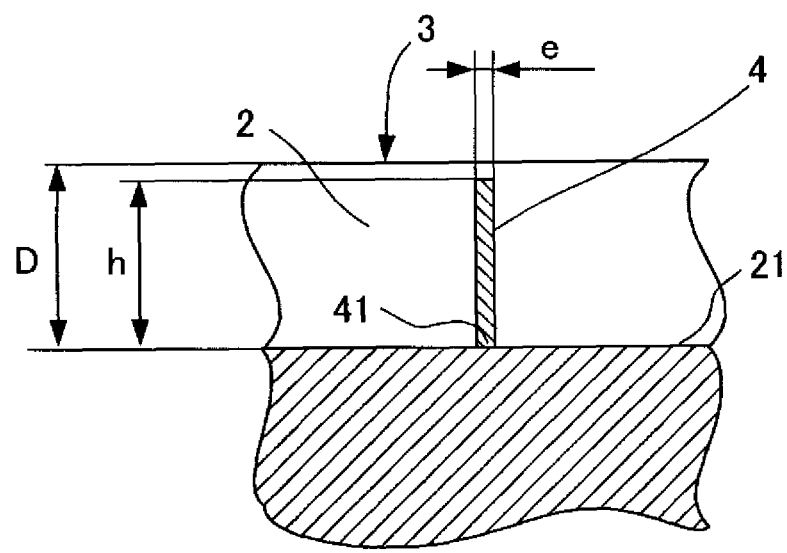

PNEUMATIC TIRE TREAD

TECHNICAL FIELD

The present invention relates to a tread for a pneumatic tire, and in particular relates to a tread for a pneumatic tire in which drainage performance can be maintained and air column resonance sound can be reduced by forming groove fences in circumferential grooves of the tread, while the groove fences can be caused to wear to a degree equivalent to that of the tread portion.

BACKGROUND ART

Air column resonance sound in circumferential grooves formed in tire treads is generated by means of resonance in a tube (air column) formed by the circumferential groove and the road surface, and the resonant frequency depends on the length of the air column formed between the circumferential groove and the road surface.

This air column resonance sound manifests itself in the form of noise inside and outside the vehicle, and its peak is often at around 1 kHz, which readily reaches the human ear. As a technique for reducing the air column resonance noise of circumferential grooves it is known to reduce the air column resonance noise by interrupting the flow of air in the direction in which the circumferential groove is formed, by providing so-called groove fences, in other words protrusions, which extend from the bottom or the walls of the circumferential groove, blocking all or most of the circumferential groove. However, interrupting the flow of air in the direction in which the circumferential groove is formed also interrupts the flow within the circumferential groove of water that penetrates into the circumferential groove when being driven on a wet road surface, and because there is a deterioration in the drainage of water interposed between the pneumatic tire and the road surface, handling stability on wet road surfaces deteriorates.

FIG. 4 of Patent literature article 1 discloses a technique aimed at achieving both drainage and a reduction in air column resonance sound by disposing within a circumferential groove three groove fences spaced apart from each other and extending respectively from the groove bottom and from opposing groove walls within the groove.

Also, FIG. 3 of Patent literature article 2 discloses a technique aimed at achieving both drainage and a reduction in air column resonance sound by disposing groove fences, which extend from the bottom of a circumferential groove, in such a way that the greater part thereof from the opening of the circumferential groove does not touch the groove walls.

PRIOR ART LITERATURE

Patent Literature

Patent literature article 1: Japanese Patent Kokai 1999-105511
Patent literature article 2: Japanese Patent Kokai 2006-341655

SUMMARY OF THE INVENTION

Problems to be Resolved by the Invention

However, with the techniques disclosed in the abovementioned Patent literature article 1 and Patent literature article 2, in order for the groove fences to function, the groove fences are thin in the circumferential direction of the tire and deform readily, but there are problems in that depending on the material used groove fences which deform readily do not wear readily when being driven repeatedly, a difference arises between the amount of wear of the groove fence and that of the tread portion, and as a result the groove fence protrudes from the tread part and the groove fence hits the road surface generating an abnormal sound. Generation of such an abnormal sound contradicts the original role of the groove fence described above, namely to reduce noise by reducing the amount of air column resonance sound. There is also a problem in that by virtue of the fact that the groove fence protrudes from the tread portion, unintended parts of the groove fence come into contact with the ground and are subjected to wear, and the groove fence becomes damaged when being driven.

To this end, the present invention is intended to resolve the problems faced by the prior art described above, and its aim1s to provide a pneumatic tire in which groove fences can be caused to wear to a degree equivalent to that of the tread portion, while reducing the air column resonance sound and maintaining drainage performance.

Means of Overcoming the Problems

In order to achieve the abovementioned objective, the present invention is a tread for a pneumatic tire having at least one circumferential groove having a bottom portion and opposing walls, at least two ribs adjacent to the circumferential groove, and a plurality of groove fences formed within the at least one circumferential groove such that the circumferential groove is interrupted, characterized in that the groove fences are formed extending from the bottom portion of the circumferential groove in a direction perpendicular to the axis of rotation of the tire in such a way that there are gaps to the walls, and at least 70% of the cross-sectional area of the circumferential groove in which the abovementioned groove fences are formed is blocked, and in that the bending parameter of the groove fences, defined as $$\frac{E \cdot I}{h^3 l}$$

where E is the modulus at 10% elongation of the material used for the groove fences, I is the second moment of area of the groove fence, h is the height of the groove fence, and l is the width of the groove fence, is at least equal to 250 Pa and at most equal to 350 Pa.

In the present invention configured in this way, the groove fences which are formed extending in the radial direction of the tire inside the circumferential groove from the bottom portion thereof and which block at least 70% of the cross-sectional area of the circumferential groove, alter, relative to a case in which groove fences are not formed, the length of an air column formed between the circumferential groove and the road surface, and it is straightforward to shift the peak of the air column resonance sound away from the frequency band which readily reaches the human ear, and as a result noise due to the air column resonance sound is improved.

Further, in the present invention the configuration is such that the bending parameter of the groove fences, defined as $E \cdot I/(h^3 l)$, is at most equal to 350 Pa, and thus the groove fences collapse under the pressure of water that has penetrated into the circumferential groove, and drainage of the circumferential groove can be ensured. In other words, if the bending parameter of the groove fences is larger than 350 Pa then the groove fences become less liable to collapse under the pressure of water that has penetrated into the circumferential groove, and thus drainage performance deteriorates.

Further, in the present invention the configuration is such that the bending parameter of the groove fences, defined as $E \cdot I/(h^3 l)$, is at least equal to 250 Pa, and thus when a groove fence is in direct contact with the road surface while passing through the tread footprint when the tire is rolling, it is possible to cause an appropriate contact pressure to be generated between the road surface and the groove fence without excessive bending occurring when the distal end portion of the groove fence comes into contact with the road surface and is subjected to a reaction force, and as a result the groove fence can be caused to wear to a degree equivalent to the amount of wear of the tread portion which has at least two ribs. In other words, if the bending parameter of the groove fences is smaller than 250 Pa then the groove fences buckle under the reaction force when in contact with the road surface, an appropriate contact pressure cannot be generated between the road surface and the groove fence, and it is thus not possible to cause the groove fence to wear to a degree equivalent to that of the tread portion.

Here, the bending parameter of the groove fences is defined as $E \cdot I/(h^3 l)$. Here, E is the modulus at 10% elongation ($M_{10}$) of the material used for the groove fences, l is the width of the groove fence projected onto a surface parallel to the axis of rotation of the tire, and I is the second moment of area. The second moment of area I is defined as $$\frac{e^3 l}{12}$$

for cases in which the abovementioned groove fence has a fixed width l in its height direction, and the groove fence has a fixed thickness e.

Further, h is the height of the groove fence in a direction perpendicular to the axis of rotation of the tire. Thus the bending parameter of the groove fence: $E \cdot I/(h^3 l)$ is a compound function of the dimensions of the groove fence and the properties of the material used for the groove fence.

In developing a tread for a pneumatic tire in which, as described hereinabove, the groove fence is caused to wear to a degree equivalent to that of the tread portion, while air column resonance sound is reduced and drainage performance is maintained, the inventors found this groove fence bending parameter $$\frac{E \cdot I}{h^3 l}$$

to be a parameter suitable for evaluating these effects (in particular drainage performance and groove fence wear performance), and found through analysis and experimentation that the effects described above could be obtained effectively if the parameter was within the range of values mentioned above (at least equal to 250 Pa and at most equal to 350 Pa).

Here, 'groove' refers to a space having a width and a depth and demarcated by two walls which under normal usage conditions do not come into contact with each other.

Further, 'circumferential groove' refers to a groove which extends in the circumferential direction of the tire, including not only straight grooves but also grooves which extend around the whole tire in the circumferential direction in a zigzag or wave-like fashion.

Further, 'tread footprint' refers to the surface region of the tread that is in contact with the road surface when the tire is mounted on an applicable rim as defined in the industrial standards mentioned below, is inflated to its rated pressure and a rated load is applied.

Further, 'standards' are defined by industrial standards that are valid in the region in which the tire is manufactured or used. Examples of industrial standards are: in Europe, the ETRTO (The European Tyre and Rim Technical Organisation) "Standards Manual"; in the USA, the TRA (the Tire and Rim Association, Inc.) "Year Book"; and in Japan, the Japan Automobile Tyre Manufacturers Association (JATMA) "JATMA Year Book". Further, 'applicable rim' refers to a rim prescribed in these standards according to the size of the tire, 'rated pressure' refers to the air pressure prescribed in these standards corresponding with the load-carrying capacity, and 'rated load' refers to the maximum mass with which the tire is permitted to be loaded according to these standards.

Further, the 'modulus of the material' in the present invention refers to the tensile stress (modulus) at 10% elongation ($M_{10}$) obtained by a vulcanized rubber composition tensile test at 23° C. measured in conformance with JISK6251, and in the present invention the tensile stress at 10% elongation in a test based on this JIS standard is used as the value 'E' mentioned above. For the test specimens, unvulcanised rubber composition is vulcanized for 40 minutes at 150° C. and is punched out using a prescribed dumbbell-shaped or ring-shaped punch cutting die. The test specimens may be collected from vulcanized tires. In this case the collected rubber composition is sliced into thin sections having a thickness of between 0.4 mm and 10 mm, and is punched out using a ring-shaped punch cutting die with an outer diameter in the range of 3 mm to 10 mm. The elongation of the test specimens is measured after the test specimens have been stress softened, and is computed by dividing the tensile force at 10% elongation by the initial cross-sectional area of the test specimen. The measurements are performed in conformance with JISK6250 and under conditions of standard temperature (23±2° C.) and humidity (relative humidity 50±5%).

In the present invention, the modulus at 10% elongation ($M_{10}$) of the material used for the groove fences is preferably between 2.0 Mpa and 8.0 MPa. In the present invention configured in this way, drainage can be ensured and the groove fences can be caused to wear to approximately the same degree as the tread portion, while achieving a reduction in the air column resonance sound. In other words, if the modulus at 10% elongation ($M_{10}$) of the material used for the groove fences is smaller than 2.0 MPa, then there is an increased danger that the groove fences will buckle when in contact with the road surface, due to reduced material stiffness, and it thus becomes difficult to cause the groove fences to wear to approximately the same degree as the tread portion. On the other hand, if the modulus at 10% elongation ($M_{10}$) of the material used for the groove fences is larger than 8.0 MPa, then due to the higher material stiffness it becomes difficult to cause the groove fences to collapse under the pressure of water that has penetrated into the circumferential groove. Therefore, if the modulus at 10% elongation ($M_{10}$) of the material used for the groove fences is set to between 2.0 MPa and 8.0 MPa, then drainage can be ensured and the groove fences can be caused to wear to a degree equivalent to that of the tread portion, while achieving a reduction in the air column resonance sound.

In the present invention the thickness of the groove fences is preferably between 0.5 mm and 0.7 mm. In the present invention configured in this way, drainage can be ensured and the groove fences can be caused to wear to a degree equivalent to that of the tread portion, while achieving a reduction in the air column resonance sound. In other words, if the thickness of the groove fences is smaller than 0.5 mm, then there is an increased danger that the groove fences will buckle when in contact with the road surface, due to reduced dimensional stiffness of the groove fences, and it thus becomes difficult to cause the groove fences to wear to approximately the same degree as the tread portion. On the other hand, if the thickness of the groove fences is larger than 0.7 mm, then due to the higher dimensional stiffness of the groove fences it becomes difficult to cause the groove fences to collapse under the pressure of water that has penetrated into the circumferential groove. Therefore, if the thickness of the groove fences is set to between 0.5 mm and 0.7 mm, then drainage can be ensured and the groove fences can be caused to wear to a degree equivalent to that of the tread portion, while achieving a reduction in the air column resonance sound.

In the present invention, the material used for the groove fences is preferably the same material as the tread part including the at least two ribs. In the present invention configured in this way, drainage can be ensured and the groove fences can be caused to wear to a degree equivalent to that of the tread portion while achieving a reduction in the air column resonance sound, without the use of a special process during manufacture, since a special material is not used for the groove fence portion.

In the present invention, the material used for the groove fences is preferably a different material to the tread part including the at least two ribs. In the present invention configured in this way, drainage can be ensured and the groove fences can be caused to wear to a degree equivalent to that of the tread portion while achieving a reduction in the air column resonance sound, even if a special material is used for the tread portion, which is critical to the performance when in contact with the ground, since it is possible to use for the groove fence portion an appropriate material adapted to the dimensions thereof.

In the present invention the cross-sectional shape of the groove fences is preferably rectangular.

In the present invention configured in this way, an effective groove fence bending efficiency can be obtained since the cross-sectional shape of the groove fences is rectangular, and as a result drainage can be ensured more reliably and the groove fences can be caused to wear to a degree equivalent to that of the tread portion while achieving a reduction in the air column resonance sound.

Advantages of the Invention

When the pneumatic tire tread according to the present invention is employed, the groove fences can be caused to wear to a degree equivalent to that of the tread portion, while the air column resonance sound is reduced and drainage performance is maintained.

BRIEF EXPLANATION OF THE FIGURES

[FIG. 2] is an enlarged sectional view of the tread for a pneumatic tire as viewed along line II-II in FIG. 1.

[FIG. 3] is an enlarged sectional view of the tread for a pneumatic tire as viewed along line III-III in FIG. 1.

MODES OF EMBODYING THE INVENTION

A preferred mode of embodiment of the present invention will now be described with reference to the diagrams.

First, a tread for a pneumatic tire according to a mode of embodiment of the present invention will be described based on FIG. 1 to FIG. 3.

Figure 1:
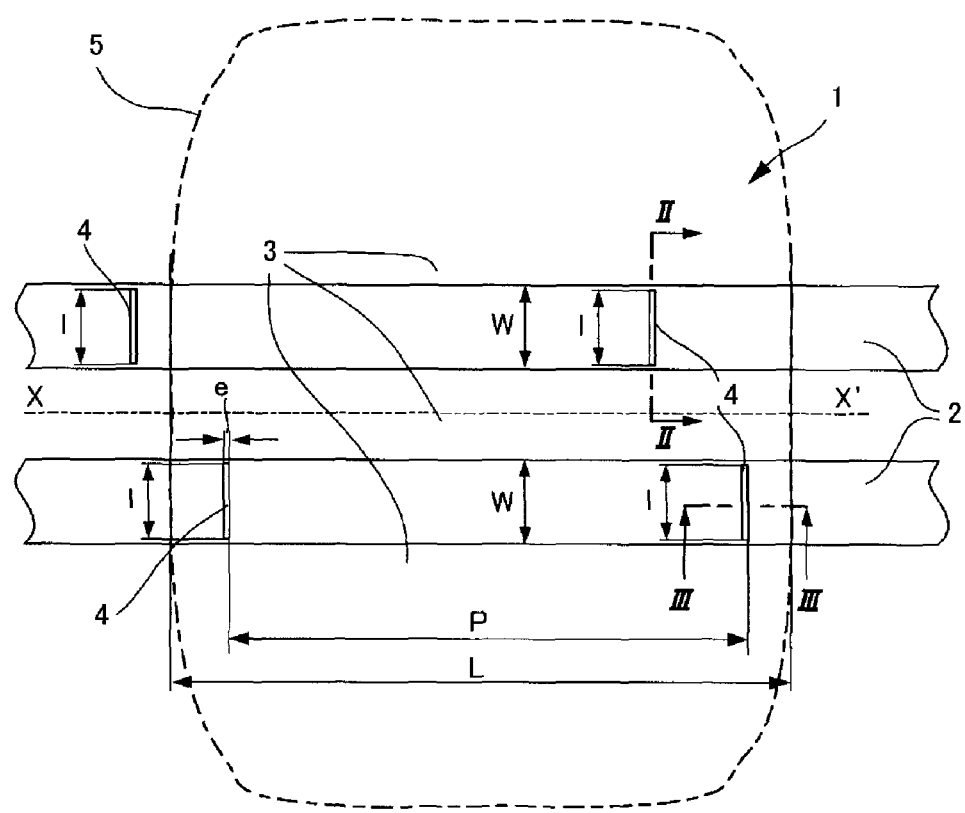
[FIG. 1] is a diagram illustrating schematically a tread for a pneumatic tire according to an embodiment of the present invention.

FIG. 1 is a diagram illustrating schematically a tread for a pneumatic tire according to an embodiment of the present invention, FIG. 2 is an enlarged sectional view of the tread for a pneumatic tire as viewed along line II-II in FIG. 1, and FIG. 3 is an enlarged sectional view of the tread for a pneumatic tire as viewed along line III-III in FIG. 1.

First, as shown in FIG. 1, reference number 1 indicates a pneumatic tire tread 1 according to the present embodiment, two circumferential grooves 2 having a width W and extending in the circumferential direction of the tire as indicated by XX' are formed in the tread 1, and ribs 3 demarcated by these circumferential grooves 2 are formed in the tread 1. It should be noted that the size of the tire in this example is 225/55R16. In the present mode of embodiment, the width W of the circumferential grooves 2 is 14.5 mm.

On the diagram are shown the tread footprint 5 and the tread footprint length L when the tire is inflated to its rated pressure and a rated load is applied. It should be noted that according to the 'ETRTO Standard Manual 2010' the applicable rim for this size is 7J, the rated pressure is 250 kPa, and the rated load is 690 kg, and in the present embodiment the footprint length L is 143 mm.

When the tire is rolling, air columns are formed between the road surface and each of the circumferential grooves 2 which pass through the tread footprint 5, and since the resonant frequency of the circumferential grooves 2 depends on the length of the air column formed in this way, in order to vary the frequency of the air column resonance sound the length of the air column should be varied.

As shown in FIG. 1, a plurality of groove fences 4 of width l, with which the circumferential grooves 2 can be largely blocked, are formed in each circumferential groove 2 for the purpose of varying the length of the air column. The installation interval P between groove fences 4 formed in the same circumferential groove 2 is provided in such a way that it is a shorter interval than the footprint length L, so that at least one groove fence is always present within the footprint 5 in each circumferential groove 2. In the present mode of embodiment, the width l of the groove fences 4 is 13.5 mm.

Next, as shown in FIG. 2 and FIG. 3, the bottom portion 41 of the groove fence 4 is connected as shown in the diagrams to the bottom portion 21 of the circumferential groove 2, and as shown in FIG. 3, the groove fence 4 is provided in such a way that it extends in the radial direction of the tire (the direction that is perpendicular to the axis of rotation of the tire). Further, as shown in FIG. 2, side surface portions 42 on each side of the groove fence 4 are provided in such a way that there is a prescribed gap between the whole thereof, excluding the connecting portion (41) described above, and opposing walls 22 of the circumferential groove 4.

As shown in FIG. 1, each groove fence 4 is formed such that it extends in a direction perpendicular to the direction in which the circumferential grooves 2 extend. Each groove fence 4 has a rectangular cross-sectional shape, and the rectangular cross section has a width l as described above, and a thickness e (refer to FIG. 3).

Further, as shown in FIG. 2, the groove fence 4 as viewed in the longitudinal direction (front view) of the circumferential groove 2 is formed in the shape of a rectangle, and as shown in FIG. 2 and FIG. 3 it has a height h which is slightly lower than the depth D of the circumferential groove 2.

The groove fence 4 is formed such that it blocks at least 70% of the cross-sectional area of the circumferential groove 2, and is formed such that it collapses under the water pressure of liquids such as principally water that flow within the circumferential groove 2. In the present mode of embodiment, the depth D of the circumferential groove 2 is 8.0 mm, the height h of the groove fence 4 is 7.0 mm, the thickness e of the groove fence 4 is 0.6 mm, and the groove fence 4 blocks approximately 87% of the cross-sectional area of the circumferential groove 2. It should be noted that for example in the case of the tire in the present mode of embodiment the groove fence 4 should be of a rectangular shape having a height h of at least approximately 5.6 mm such that it blocks at least 70% of the cross-sectional area of the circumferential groove 2. It should be noted that without limitation to the present mode of embodiment, if the width W and the depth D of the tire circumferential groove 2 change, the height h of the groove fence 4 should be modified accordingly such that it blocks at least 70% of the cross-sectional area of the circumferential groove 2.

In the present mode of embodiment, the groove fences 4 consist of the same material as the ribs 3 of the tread 1 (the tread part). It should be noted that the groove fences 4 may consist of a different material to the ribs 3.

Further, in the present mode of embodiment the groove fences 4 are formed using a material which has a modulus at 10% elongation ($M_{10}$) of 5.8 MPa. Thus in the present invention the bending parameter of the groove fence 4, prescribed (defined) by $$\frac{E \cdot I}{h^3 l}$$

is 304 Pa. The value of this bending parameter 304 Pa is a value such that the groove fence 4 does not collapse when only air is flowing through the circumferential groove 2 when being driven on a normal dry road surface, as a result of which the air column becomes shorter and air column resonance sound is reduced. It should be noted that the same effect is obtained if the value of the bending parameter is at least equal to 250 Pa and at most equal to 350 Pa.

Here, E is the modulus at 10% elongation ($M_{10}$) of the material used for the groove fence 4, l is the width of the groove fence 4 projected onto a surface parallel to the axis of rotation of the tire, I is the second moment of area, defined from the abovementioned width l of the groove fence 4 and thickness e of the groove fence 4, as $$\frac{e^3 l}{12}$$

and h is the height of the groove fence 4 in a direction perpendicular to the axis of rotation of the tire.

Next, the condition when a tread for a pneumatic tire according to a mode of embodiment of the present invention is being driven on a wet road surface will be described with reference to FIG. 4 and FIG. 5.

Figure 4:
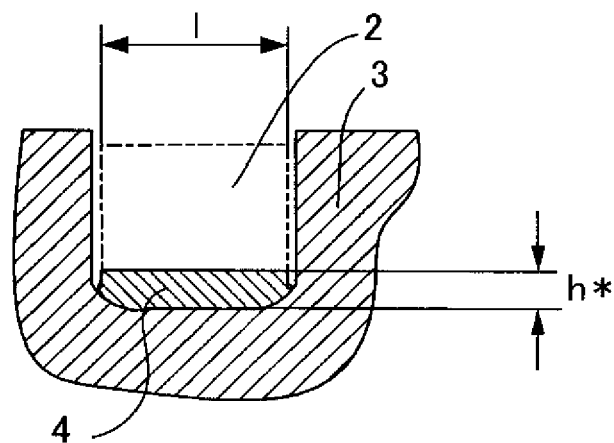
[FIG. 4] is a diagram which illustrates, similarly to FIG. 2, an enlarged sectional view of the tread for a pneumatic tire as viewed along line II-II in FIG. 1, illustrating schematically a state in which the tire is being driven on a wet road surface.
Figure 5:
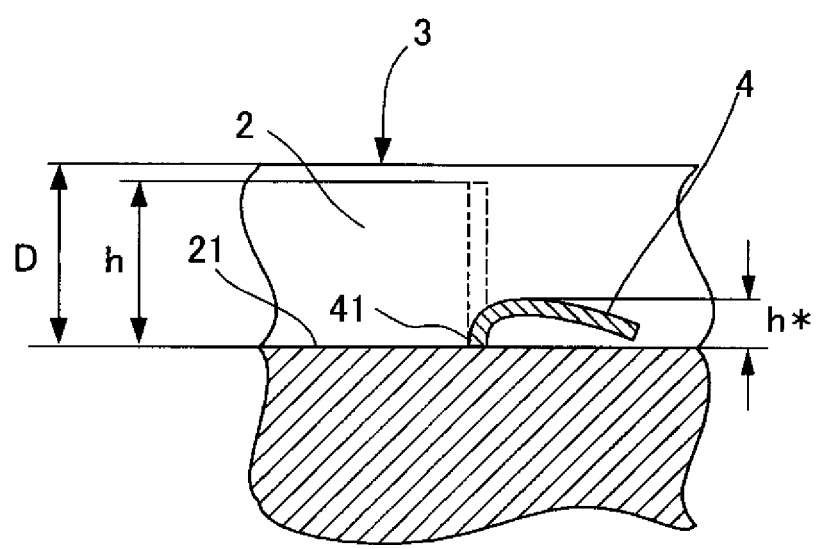
[FIG. 5] is a diagram which illustrates, similarly to FIG. 3, an enlarged sectional view of the tread for a pneumatic tire as viewed along line III-III in FIG. 1, illustrating schematically a state in which the tire is being driven on a wet road surface.

FIG. 4 is an enlarged sectional view illustrating a state in which the tread for a pneumatic tire as viewed along line II-II in FIG. 1 is being driven on a wet road surface, and FIG. 5 is an enlarged sectional view illustrating a state in which the tread for a pneumatic tire as viewed along line III-III in FIG. 1 is being driven on a wet road surface.

As shown in FIG. 4 and FIG. 5, the groove fence 4 having a bending parameter set to 304 Pa as described above collapses or bends under the water pressure generated by liquids such as principally water flowing through the circumferential groove 2 when being driven on a wet road surface, and as a result its height is reduced to h*, the main part of the circumferential groove is released by virtue of the fact that the height is reduced, and drainage is ensured. It should be noted that the same effect is obtained if the value of the bending parameter is at least equal to 250 Pa and at most equal to 350 Pa.

Next, the state after the tread has become worn, in a tread for a pneumatic tire according to a mode of embodiment of the present invention, will now be described with reference to FIG. 6.

Figure 6:
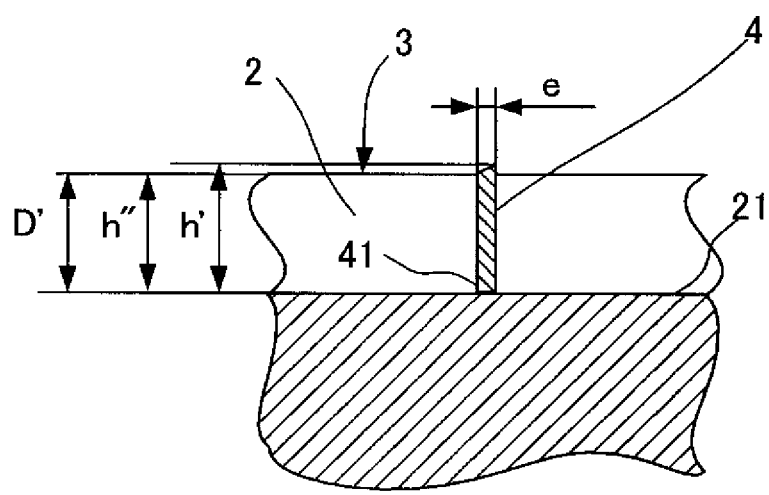
[FIG. 6] is a diagram which illustrates, similarly to FIG. 3, an enlarged sectional view of the tread for a pneumatic tire as viewed along line III-III in FIG. 1, illustrating schematically a state in which the tread portion has been worn down by approximately 30%.

FIG. 6 is an enlarged sectional view of a state in which the tread for a pneumatic tire as viewed along line III-III in FIG. 1 has been worn down by approximately 30%.

FIG. 6 illustrates a state in which, after having been driven a prescribed distance, the depth D of the circumferential groove 2 has been worn down to a depth D' which is shallower than the original height h of the groove fence 4. After having been driven a prescribed distance, the groove fence 4 having a bending parameter set to 304 Pa as described above has worn down such that its distal end portion which is in contact with the road surface is oblique and its height has been reduced from its original height h to h' on the high side and h" on the low side, and the height h" on the low side is approximately the same height as the depth D' of the circumferential groove 2. It should be noted that the same effect is obtained if the value of the bending parameter is at least equal to 250 Pa and at most equal to 350 Pa.

A groove fence 4 of which the bending parameter described above has been appropriately set (although it is 304 Pa in the present mode of embodiment, the value of the bending parameter may be at least equal to 250 Pa and at most equal to 350 Pa.) does not collapse under the pressure of air when rolling while being driven on a dry road surface, and it also does not buckle. Further, although it falls slightly or bends due to reaction forces when it comes into contact with the road surface, an appropriate contact pressure is generated between the distal end portion of the groove fence 4 and the road surface, and it becomes worn through the generation of slippage within the tread footprint as a result of the rolling of the tire. As a result, the groove fence 4 can be caused to wear to a degree equivalent to that of the tread portion.

It should be noted that as variations of the present mode of embodiment, provided that it has the effect described above, the shape of the groove fence 4 across the width l (the cross-sectional shape) may be formed with an undulating shape such that it collapses under water pressure as described above and such that an appropriate contact pressure is generated against the road surface; or the surface of the groove fence 4 as viewed from the longitudinal direction (front view) of the circumferential groove 2 may for example be provided to some extent with an uneven portion which adjusts the degree to which the groove fence 4 can bend; or it may be formed as another shape such as a rectangular or trapezoidal shape with corners that are rounded when viewed from the front.

In such cases, if for example a wave-shaped or protruding body is provided as described above then the second moment of area may be calculated by approximation using the defining equation described above ($e^3l/12$), using the average thickness e of the groove fence 4, or a suitable second moment of area defining equation appropriate to the cross-sectional shape according to the variation may be used.

A particularly preferred mode of embodiment of the present invention has been described hereinabove, but the present invention may be modified and implemented in the form of various embodiments without limitation to the mode of embodiment shown in the diagrams.

Embodiment

Next, in order to clarify the advantages of the present invention, an explanation will be given of the results of tests performed using a conventional example in which groove fences are not provided, a comparative example provided with groove fences, and a pneumatic tire according to embodiment 1 of the present invention.

The specimen tires according to the conventional example, the comparative example and embodiment 1 were in each case tires of size 225/55R16, the wheel size was 7.0J×16, and the pressure was set to 250 kPa.

(1) Wear Performance:

Unused specimen tires were mounted, using the rims and at the pressure mentioned above, onto the four wheels of three identical vehicles (2000 cc displacement FR cars) which were driven in a three-vehicle convoy approximately 7,000 km on a prescribed asphalt test course with one driver in each vehicle, and the depths of the remaining grooves and the heights of the remaining groove fences were measured.

(2) Drainage Performance:

Unused specimen tires were mounted, using the rims and at the pressure mentioned above, onto the four wheels of vehicles (4300 cc displacement FR cars) which were driven, with one driver in each vehicle, on a straight-line course comprising an asphalt road surface provided with a pool of water of depth approximately 10 mm, and the driving speed at which the driver in the vehicle felt that the tires were hydroplaning is presented as an index, where 100 corresponds to the conventional example. A larger index indicates a more satisfactory performance.

(3) Noise Performance:

Unused specimen tires were caused to rotate, using the rims and at the pressure mentioned above, at a speed of 60 km/h on a rotating drum of diameter 2.7 m installed in an anechoic chamber, and the noise level was measured using a microphone installed in the vicinity of the point at which the tire entered the tread footprint. The measured noise is presented as the difference in sound pressure level compared with the conventional example, for the sound pressure level of the frequency band from 0 to 2,000 Hz to which an A filter has been applied. A smaller value indicates a more satisfactory performance.

TABLE 1

|  | Embodiment 1 | Conventional example | Comparative example |
| --- | --- | --- | --- |
| Groove fences? | Yes | No | Yes |
| Groove fence thickness (mm) | 0.6 | — | 0.6 |
| Initial groove fence height (mm) | 7.0 | — | 7.0 |
| Modulus ($M_{10}$) of groove fence material (MPa) | 5.8 | 5.8 | 1.3 |
| Groove fence bending parameter (Pa) | 304 | — | 68 |
| Depth of remaining circumferential groove (mm) | 5.5 | 5.5 | 5.5 |
| Height of remaining groove fence (high side) (mm) | 6.0 | — | 7.0 |
| Height of remaining groove fence (low side) (mm) | 5.5 | — | 6.5 |
| Drainage performance (index) | 100 | 100 | 100 |
| Noise performance (dBA) | 0.0 | +2.0 | 0.0 |

As shown in Table 1, it can be confirmed that the groove fences in the product according to the embodiment are subjected to an equivalent degree of wear to the wear of the tread portion, while noise performance and drainage performance are maintained.

EXPLANATION OF THE REFERENCE NUMBERS

1 Pneumatic tire tread
2 Circumferential groove
21 Bottom portion of circumferential groove 2
22 Opposing walls of circumferential groove 4
3 Rib
4 Groove fence
41 Bottom portion of groove fence 4 (portion connected to bottom portion 21 of circumferential groove 2)
42 Side surface portions on either side of groove fence 4
5 Tread footprint

The invention claimed is:

1. A tread for a pneumatic tire having at least one circumferential groove having a bottom portion and opposing walls, at least two ribs adjacent to the circumferential groove, and a plurality of groove fences formed within the abovementioned at least one circumferential groove such that the abovementioned circumferential groove is interrupted, wherein the abovementioned groove fences are formed extending from the bottom portion of the abovementioned circumferential groove in a direction perpendicular to the axis of rotation of the tire in such a way that there are gaps to the abovementioned walls, and at least 70% of the cross-sectional area of the abovementioned circumferential groove in which the abovementioned groove fences are formed is blocked, and in that the bending parameter of the groove fences which extend from the bottom portion of the abovementioned circumferential groove in a direction perpendicular to the axis of rotation of the tire, defined as $(EI)/(h^3 l)$, where E is the modulus at 10% elongation of the material used for the abovementioned groove fences, I is the second moment of area of the abovementioned groove fence, h is the height of the abovementioned groove fence, and l is the width of the abovementioned groove fence, is at least equal to 250 Pa and at most equal to 350 Pa.

2. A tread for a pneumatic tire according to claim 1, wherein the modulus at 10% elongation (M10) of the material used for the abovementioned groove fences is at least equal to 2.0 MPa and at most equal to 8.0 MPa.

3. A tread for a pneumatic tire according to claim 2, wherein the thickness of the abovementioned groove fences is at least equal to 0.5 mm and at most equal to 0.7 mm.

4. A tread for a pneumatic tire according to claim 3, wherein the material used for the abovementioned groove fences is the same material as the material of the tread part including the abovementioned at least two ribs.

5. A tread for a pneumatic tire according to claim 3, wherein the material used for the abovementioned groove fences is a different material to the material of the tread part including the abovementioned at least two ribs.

6. A tread for a pneumatic tire according to claim 4, wherein the cross-sectional shape of the abovementioned groove fences is rectangular.

7. A tread for a pneumatic tire according to claim 5, wherein the cross-sectional shape of the abovementioned groove fences is rectangular.

\* \* \* \* \*